United States Patent [19]

Hosono et al.

[11] Patent Number: 5,606,902
[45] Date of Patent: Mar. 4, 1997

[54] LINEAR ACTUATOR

[75] Inventors: Masayuki Hosono; Yoshihiro Toshimori, both of Ibaraki, Japan

[73] Assignee: SMC Kabushiki Kaisha, Tokyo, Japan

[21] Appl. No.: 559,452

[22] Filed: Nov. 15, 1995

[30] Foreign Application Priority Data

Nov. 24, 1994 [JP] Japan .................................. 6-290112

[51] Int. Cl.⁶ .............................. F15B 15/00; F01B 29/00
[52] U.S. Cl. ...................................... 92/88; 92/151
[58] Field of Search ................................ 92/88, 129, 137, 92/138, 151

[56] References Cited

U.S. PATENT DOCUMENTS

| | | | |
|---|---|---|---|
| 4,401,011 | 8/1983 | Wallberg | 92/138 X |
| 4,403,389 | 9/1983 | Coope . | |
| 4,664,020 | 5/1987 | Kaiser | 92/88 |
| 4,838,147 | 6/1989 | Grishchenko | 92/88 |
| 5,245,910 | 9/1993 | Drittel | 92/88 |
| 5,303,638 | 4/1994 | Green | 92/88 |
| 5,363,741 | 11/1994 | Takada et al. | 92/146 X |

FOREIGN PATENT DOCUMENTS

| | | |
|---|---|---|
| 0536799 | 4/1993 | European Pat. Off. . |
| 3620741 | 1/1987 | Germany . |
| 5-42716 | 6/1993 | Japan . |
| 542716 | 6/1993 | Japan . |

OTHER PUBLICATIONS

Patent Abstracts of Japan, vol. 9, No. 87 (M–372)(1810), Apr. 17, 1985, JP-A-59-214537, Dec. 4, 1984.
Patent Abstracts of Japan, vol. 9, No. 229 (M–413)(1952), Sep. 14, 1985, JP-A-60-085840, May 15, 1985.
Patent Abstracts of Japan, vol. 9, No. 206 (M–406)(1929), Aug. 23, 1985, JP-A-60-067046, Apr. 17, 1985.

*Primary Examiner*—John E. Ryznic
*Attorney, Agent, or Firm*—Oblon, Spivak, McClelland, Maier & Neustadt, P.C.

[57] ABSTRACT

A linear actuator has a cylinder body having a slot defined therein, a slide table, a joint connected substantially perpendicularly to a lower surface of the slide table, a pair of pistons slidably disposed in a through hole defined in the cylinder body and defining respective cylinder chambers in the through hole, for displacing the joint in response to a fluid under pressure supplied to one of the cylinder chambers, a guide projecting from a lower surface of the slide table, a pair of spaced guide blocks projecting from an upper surface of the cylinder body, and a plurality of balls rollingly interposed between the guide and the guide blocks.

8 Claims, 4 Drawing Sheets

LINEAR ACTUATOR

BACKGROUND OF THE INVENTION

1. Field of the Invention

The present invention relates to a linear actuator for reciprocally moving a slide table in axial directions of a cylinder body by introducing a fluid under pressure into a cylinder chamber in the cylinder body through fluid outlet/inlet ports.

2. Description of the Related Art

Linear actuators have heretofore been used as means for conveying workpieces or the like. Linear actuators are capable of linearly reciprocally moving a movable table along a cylinder body for thereby conveying a workpiece placed on the movable table.

One known linear actuator is disclosed in Japanese laid-open utility model publication No. 5-42716, for example. FIGS. 6A and 6B of the accompanying drawings illustrate the disclosed linear actuator in the form of a fluid pressure cylinder assembly. As shown in FIGS. 6A and 6B, the fluid pressure cylinder assembly, generally designated by the reference numeral 1, comprises a cylinder body 2, a guide rail 3 projecting upwardly from and extending longitudinally on an upper surface of the cylinder body 2, and a slide table 4 mounted on the guide rail 3 for sliding displacement therealong in response to displacement of a piston disposed in a cylinder chamber which is defined in the cylinder body 2.

The slide table 4 has a ball circulation hole (not shown) defined longitudinally therein and accommodating a plurality of balls for rolling movement therein. The slide table 4 also has a plurality of screw holes 5a~5d that are defined in an upper surface thereof for attachment of a workpiece to be conveyed by the fluid pressure cylinder assembly 1. The cylinder body 2 has a pair of attachment holes 6a, 6b defined in respective diagonally opposite corners thereof for installing the cylinder body 2 on another member (not shown).

The cylinder body 2 has a transverse width L represented by $L \approx L_1 + (L_2 \times 2)$ where $L_1$ is the width of the guide rail 3 and $L_2$ is the diameter of each of the attachment holes 6a, 6b. Therefore, the transverse width L is substantially equal to the sum of the width $L_1$ of the guide rail 3 and the diameters $L_2$ of the attachment holes 6a, 6b. The width $L_1$ of the guide rail 3 cannot be reduced because the rigidity of the slide table 4 would be lowered if width $L_1$ were reduced. As a result, the transverse width L is required to be substantially equal to the sum of the width $L_1$ of the guide rail 3 and the diameters $L_2$ of the attachment holes 6a, 6b so that the cylinder body 2 maintains a desired level of rigidity.

Inasmuch as the transverse width L of the cylinder body 2 cannot be reduced because of the required width $L_1$ of the guide rail 3, the fluid pressure cylinder assembly 1 cannot be reduced in size and weight.

A process of machining a slide table blank into the slide table 4 is complex because the ball circulation hole needs to be defined longitudinally in the slide table blank and the screw holes 5a~5d need to be defined in the slide table in a direction different from the direction of the ball circuit hole.

SUMMARY OF THE INVENTION

It is a general object of the present invention to provide a linear actuator which is reduced in size and weight through a reduction in the transverse width of a cylinder body without causing a reduction in the accuracy of linear movement of a slide table.

A primary object of the present invention is to provide a linear actuator which includes a slide table that can be machined with ease.

Another object of the present invention is to provide a linear actuator which includes a slide table that can be replaced with a variety of different slide tables.

The above and other objects, features, and advantages of the present invention will become apparent from the following description when taken in conjunction with the accompanying drawings in which a preferred embodiment of the present invention is by way of illustrative example.

DETAILED DESCRIPTION OF THE PREFERRED EMBODIMENT

Figure 1:
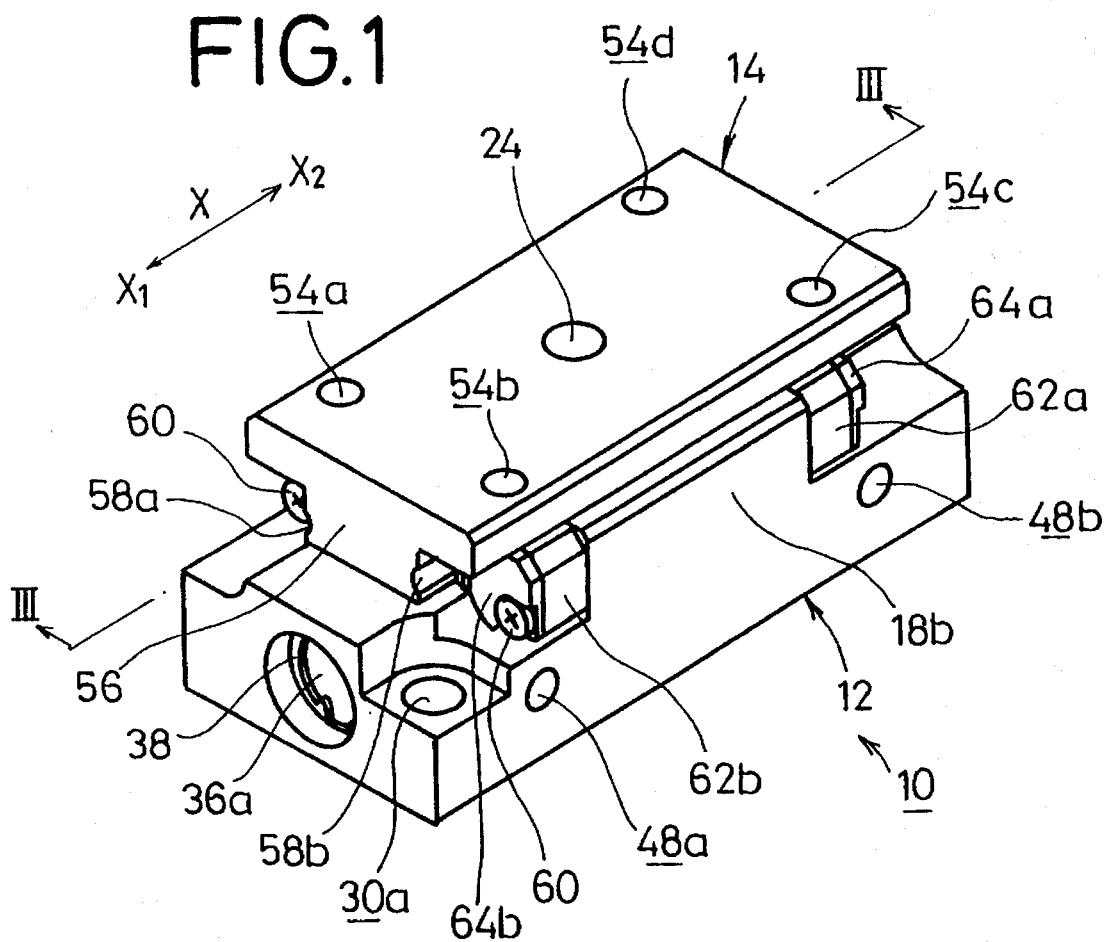
FIG. 1 is a perspective view of a linear actuator according to the present invention.

FIG. 1 shows in perspective a linear actuator 10 according to the present invention. The linear actuator 10 basically comprises a cylinder body 12, a slide table 14 mounted on the cylinder body 12 for linear reciprocating movement in longitudinal directions of the cylinder body 12, and a pair of slide mechanisms 16 (see FIG. 2) for reciprocally moving the slide table 14 smoothly in the longitudinal directions of the cylinder body 12.

Figure 2:
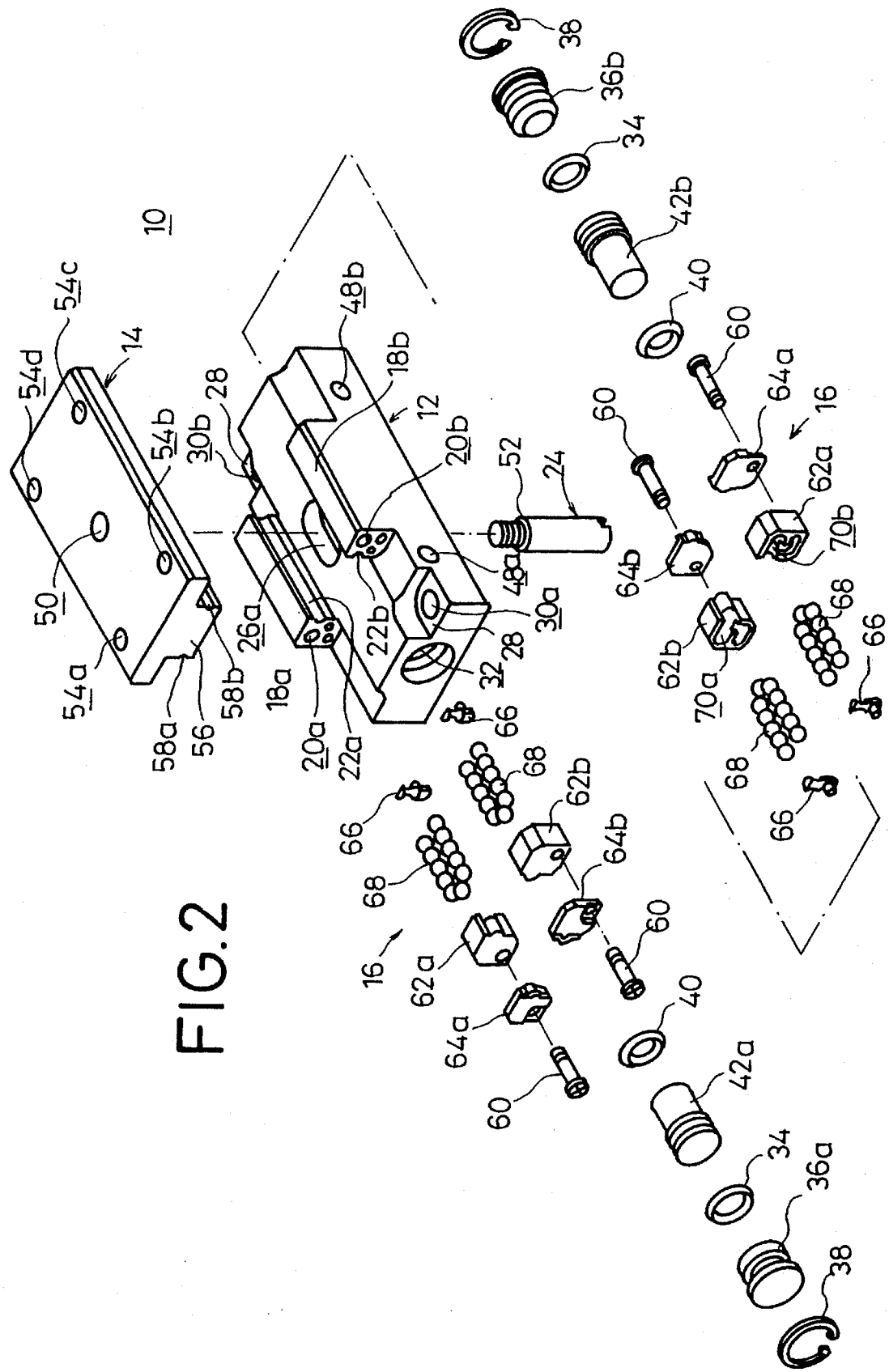
FIG. 2 is an exploded perspective view of the linear actuator shown in FIG. 1.
Figure 3:
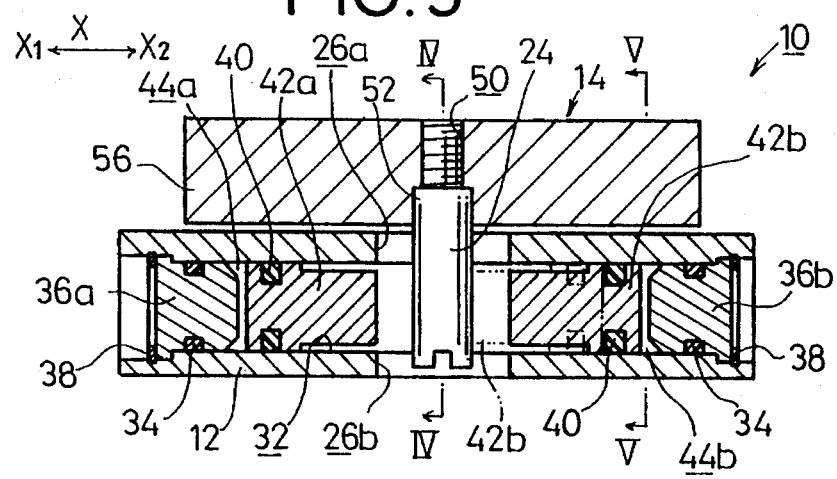
FIG. 3 is cross-sectional view taken along line III—III of FIG. 1.
Figure 4:
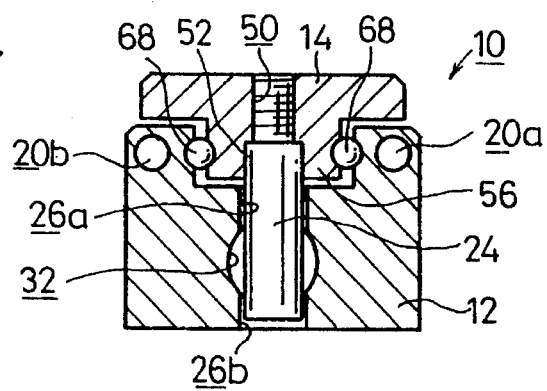
FIG. 4 is a cross-sectional view taken along line IV—IV of FIG. 3.

As shown in FIG. 2, the cylinder body 12 has a pair of integral guide blocks (second guide means) 18a, 18b disposed on an upper surface thereof in transversely spaced confronting relation to each other. The guide blocks 18a, 18b have respective ball circulation holes 20a, 20b and respective ball rolling grooves 22a, 22b defined therein in the longitudinal direction of the cylinder body 12 in spaced relation to the ball circulation holes 20a, 20b. The cylinder body 12 has a pair of substantially elliptical slots 26a, 26b (see FIG. 3) defined substantially centrally in respective upper and lower surfaces thereof for allowing a substantially cylindrical joint 24 (described later on) to be displaced freely therein.

The cylinder body 12 also has a pair of attachment holes 30a, 30b defined in its upper surface at respective steps 28 in diagonally opposite corners thereof for installing the cylinder body 2 on another member (not shown) with bolts (not shown) inserted through the attachment holes 30a, 30b.

Figure 5:
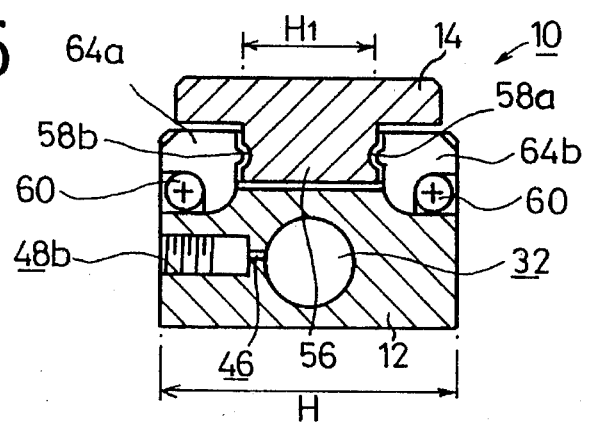
FIG. 5 is a cross-sectional view taken along line V—V of FIG. 3.

The cylinder body 12 further has a through hole 32 (see FIGS. 2 and 3) defined longitudinally therein and communicating with the slots 26a, 26b. The opposite ends of the through hole 32 are closed by respective end caps 36a, 36b with respective seal rings 34 mounted thereon. The end caps 36a, 36b are hermetically retained in the opposite ends of the through hole 32 by respective retaining rings 38. The through hole 32 accommodates therein a pair of pistons 42a, 42b disposed for sliding displacement along an inner wall surface of the through hole 32. Seal rings 40 are mounted respectively on outer circumferential surfaces of the pistons 42a, 42b. The end caps 36a, 36b and the piston 42a, 42b jointly define respective cylinder chambers 44a, 44b in the through hole 32. The cylinder chambers 44a, 44b are held in communication with fluid outlet/inlet ports 48a, 48b (see FIGS. 1 and 5) defined in one side of the cylinder body 12, through respective fixed restrictions 46.

The substantially cylindrical joint 24 which extends substantially vertically is positioned between the pistons 42a, 42b, and has an externally threaded upper end threaded in a threaded hole 50 (see FIGS. 2 and 3) defined substantially centrally in the slide table 14. The joint 24 includes a spigot portion 52 immediately below the externally threaded upper end. The spigot portion 52 is securely fitted in an annular step which is defined in the slide table 14 beneath the threaded hole 50, so that the joint 24 is firmly fixed to the slide table 14. When a fluid under pressure is introduced through one of the fluid outlet/inlet ports 48a, 48b into the corresponding one of the cylinder chambers 44a, 44b, the corresponding one of the pistons 42a, 42b is displaced into pressing engagement with the joint 24, which then displaces the slide table 14 in the longitudinal axial direction indicated by the arrow X, i.e., the arrow $X_1$ or $X_2$ (see FIGS. 1 and 3).

As shown in FIGS. 1 and 2, the slide table 14 has a plurality of attachment holes 54a–54d defined therein at respective four corners thereof. The slide table 14 also has a guide (first guide means) 56 integrally projecting upwardly from and extending longitudinally on a lower surface of the slide table 14. The guide 56 has a pair of ball rolling grooves 58a, 58b (see also FIG. 5) defined in respective transverse opposite sides thereof and extending in the longitudinal direction thereof.

As shown in FIG. 2, the slide mechanisms 16 are positioned respectively on longitudinal opposite ends of the guide blocks 18a, 18b. Each of the slide mechanisms 16, which are identical in structure to each other, comprises two pairs of covers 62a, 62b and two pairs of scrapers 64a, 64b which are mounted on respective longitudinally opposite ends of the guide blocks 18a, 18b by screws 60. The ball circulation holes 20a, 20b defined in the respective guide blocks 18a, 18b extend in the longitudinal direction thereof, and the ball rolling grooves 22a, 22b defined in the respective guide blocks 18a, 18b extend along confronting inner wall surfaces thereof in the longitudinal direction thereof.

The slide mechanism 16 also has two pairs of return guides 66 mounted respectively on the longitudinally opposite ends of the guide blocks 18a, 18b and interconnecting the ball circulation holes 20a, 20b and the ball rolling grooves 22a, 22b, and two sets of balls (rolling elements) 68 placed in the ball circulation holes 20a, 20b and the ball rolling grooves 22a, 22b for rolling movement therealong. The covers 62a, 62b have respective recesses 70b, 70a defined therein which interconnect the ball circulation holes 20a, 20b and the ball rolling grooves 22a, 22b. The ball circulation holes 20a, 20b, the ball rolling grooves 22a, 22b, the return guides 66, and the recesses 70b, 70a jointly serve as endless circulatory tracks for the balls 68 to rolling move therealong.

Operation and advantages of the linear actuator 10 will be described below.

A fluid supplied under pressure from a fluid pressure supply (not shown) is introduced into the fluid outlet/inlet port 48b by a directional control valve (not shown). At this time, the other fluid outlet/inlet port 48a is vented to the atmosphere by the directional control valve.

The introduced fluid is supplied through the fixed restriction 46 connected to the fluid outlet/inlet port 48b into the cylinder chamber 44b, displacing the piston 42b in the direction indicated by the arrow $X_1$. The piston 42b is displaced until an end thereof abuts against the joint 24 as indicated by the broken lines in FIG. 3. Continued displacement of the piston 42b displaces the joint 24 along the slots 26a, 26b in the direction indicated by the arrow $X_1$. Therefore, the slide table 14 coupled to the joint 24 is displaced in unison with the joint 24 in the direction indicated by the arrow $X_1$. The slide table 14 reaches an end of its stroke when the joint 24 engages respective inner end surfaces of the slots 26a, 26b.

For displacing the slide table 14 in the opposite direction indicated by the arrow $X_2$, a fluid under pressure is introduced into the fluid outlet/inlet port 48a by the directional control valve. The introduced fluid is supplied through the fixed restriction 46 connected to the fluid outlet/inlet port 48a into the cylinder chamber 44a, displacing the piston 42a in the direction indicated by the arrow $X_2$. The piston 42a pushes the joint 24 along the slots 26a, 26b in the direction indicated by the arrow thereby displacing the slide table 14 also in the direction indicated by the arrow $X_2$. The slide table 14 reaches an opposite end of its stroke when the joint 24 engages respective opposite inner end surfaces of the slots 26a, 26b.

Figure 6A:
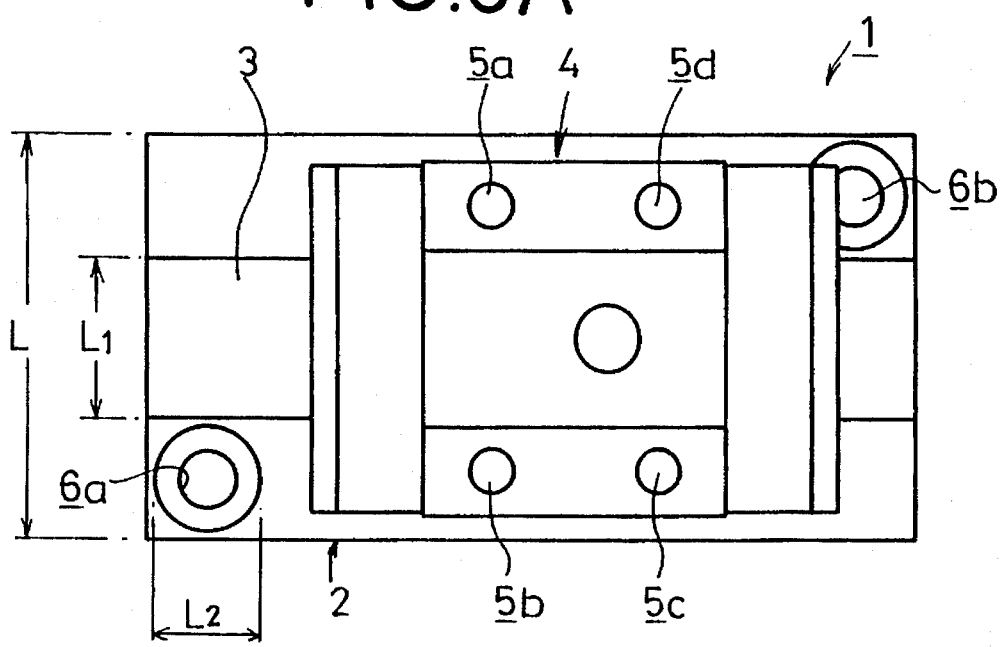
FIG. 6A is a plan view of a conventional fluid pressure cylinder assembly as a linear actuator.
Figure 6B:
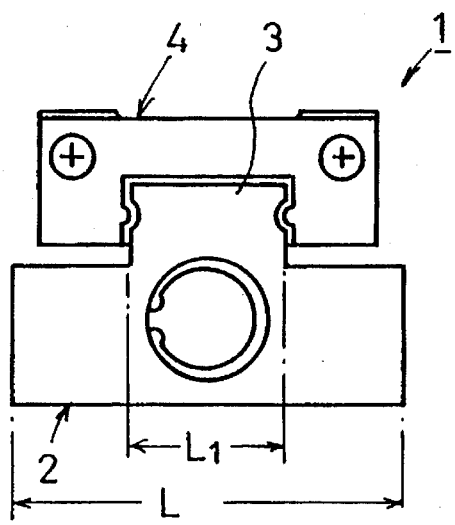
FIG. 6B is a side elevational view of the conventional fluid pressure cylinder assembly shown in FIG. 6A.

As described above, the guide 56 integrally projects upwardly from and extends longitudinally on the lower surface of the slide table 14, and the guide blocks 18a, 18b which guide the guide 56 through the balls 68 for sliding movement in the longitudinal direction of the cylinder body 12 are integrally formed with the cylinder body 12. The attachment holes 30a, 30b can be defined in the cylinder body 12 at desired positions thereon without being affected by the transverse width $H_1$ (see FIG. 5) of the cylinder body 12, which is not the case with the conventional linear actuator shown in FIGS. 6A and 6B. Consequently, the cylinder body 12 of the linear actuator 10 according to the present invention can reduce its transverse width H (see FIG. 5), with the result that the linear actuator 10 can be reduced in size and weight.

The attachment holes 54a–54d are oriented in one direction with respect to the slide table 14. Since the slide table 14 does not have various holes defined in different directions, the slide table 14 can be machined relatively easily from a slide table blank.

The guide 56 which is guided by the guide blocks 18a, 18b simply projects downwardly from the lower surface of the guide table 14. Therefore, the slide table 14 can be replaced with a variety of different slide tables insofar as they have guides identical to the guide 56.

Although a certain preferred embodiment of the present invention has been shown and described in detail, it should be understood that various changes and modifications may be made therein without departing from the scope of the appended claims.

What is claimed is:

1. A linear actuator comprising:

a cylinder body having fluid outlet/inlet ports;

a slide table movably mounted on said cylinder body for movement in an axial direction thereof in response to a fluid under pressure which is introduced into said cylinder body through one of said fluid outlet/inlet ports;

first guide means for guiding said slide table to move in said axial direction, said first guide means being disposed on a lower surface of said slide table and extending in the axial direction of said cylinder body, said first guide means projecting toward said cylinder body;

a pair of second guide means for guiding said slide table to move in said axial direction, said second guide means being disposed on an upper surface of said cylinder body and extending in the axial direction of said cylinder body, said second guide means confronting each other with said first guide means positioned therebetween; and a pair of slide mechanisms each having a plurality of rolling elements rollingly interposed between said first guide means and said second guide means.

2. A linear actuator according to claim 1, wherein said first guide means comprises a guide integral with said slide table and said second guide means comprises respective guide blocks integral with said cylinder body.

3. A linear actuator according to claim 2, wherein said slide mechanisms are positioned respectively on longitudinal opposite ends of said guide blocks, said slide mechanisms comprising a plurality of balls as said rolling elements, covers, return guides, and scrapers which are mounted on the longitudinal opposite ends of said guide blocks, for guiding said balls.

4. A linear actuator comprising:

a cylinder body having a through hole defined in an axial direction thereof, a slot defined in an upper surface thereof in communication with said through hole, and fluid outlet/inlet ports;

a slide table movably mounted on said cylinder body for movement in the axial direction thereof;

a joint connected substantially perpendicularly to a lower surface of said slide table through said slot, for movement in unison with said slide table;

a pair of pistons slidably disposed in said through hole and defining a pair of cylinder chambers in said through hole in communication with said fluid outlet/inlet ports, respectively, said pistons being slidable in said through hole to move said joint and said slide table in the axial direction of said cylinder body in response to a fluid under pressure which is introduced into one of said cylinder chambers through one of said fluid outlet/inlet ports which communicates with said one of the cylinder chambers;

a guide disposed on a lower surface of said slide table and extending in the axial direction of said cylinder body;

a pair of guide blocks disposed on an upper surface of said cylinder body and confronting each other in a direction transverse to the axial direction of said cylinder body; and a plurality of rolling elements interposed between said guide and said guide blocks for rolling movement along an endless circulatory track.

5. A linear actuator according to claim 4, wherein each of said guide blocks has a ball circulation hole defined longitudinally therein, a ball rolling groove defined in an inner wall surface thereof in spaced relation to said ball circulation hole, said endless circulatory track including said ball circulation hole and said ball rolling groove.

6. A linear actuator according to claim 4, wherein said guide projects from the lower surface of said slide table toward said cylinder body, and has a pair of ball rolling grooves extending longitudinally therein.

7. A linear actuator according to claim 4, wherein said slide table has a threaded hole defined substantially centrally therein and an annular step defined therein adjacent to said threaded hole, said joint having an end threaded in said threaded hole and a spigot portion fitted in said annular step.

8. A linear actuator according to claim 7, wherein said joint is connected to said slide table perpendicularly to the axial direction of said slide table.

* * * * *